(12) United States Patent
Rossi et al.

(10) Patent No.: US 12,402,750 B2
(45) Date of Patent: Sep. 2, 2025

(54) BEVERAGE LIQUID DISPENSER

(71) Applicant: DE' LONGHI APPLIANCES S.R.L., Treviso (IT)

(72) Inventors: Michele Rossi, Treviso (IT); Mario Bertanza, Treviso (IT)

(73) Assignee: DE' LONGHI APPLIANCES S.R.L., Treviso (IT)

( * ) Notice: Subject to any disclaimer, the term of this patent is extended or adjusted under 35 U.S.C. 154(b) by 900 days.

(21) Appl. No.: 17/627,666

(22) PCT Filed: Jun. 10, 2020

(86) PCT No.: PCT/EP2020/066111
§ 371 (c)(1),
(2) Date: Jan. 15, 2022

(87) PCT Pub. No.: WO2021/008784
PCT Pub. Date: Jan. 21, 2021

(65) Prior Publication Data
US 2022/0354299 A1 Nov. 10, 2022

(30) Foreign Application Priority Data
Jul. 17, 2019 (IT) .................. 102019000012198

(51) Int. Cl.
*A47J 31/46* (2006.01)
*A47J 31/44* (2006.01)

(52) U.S. Cl.
CPC ......... *A47J 31/467* (2013.01); *A47J 31/4403* (2013.01); *A47J 31/465* (2013.01)

(58) Field of Classification Search
CPC ...... A47J 31/46; A47J 461/468; A47J 469/24; A47J 4496/36; A47J 542/0668; A47J 4464/0663; B65D 47/043; E03C 1/0407
(Continued)

(56) References Cited

U.S. PATENT DOCUMENTS

| | | |
|---|---|---|
| 2005/0155494 A1 | 7/2005 | Brouwer |
| 2014/0137749 A1* | 5/2014 | Marchi .................. A47J 31/46 99/302 R |

FOREIGN PATENT DOCUMENTS

| | | | |
|---|---|---|---|
| EP | 2565151 A1 | 3/2013 | |
| WO | WO-2016174535 A1 * | 11/2016 | .......... A47J 31/4464 |

(Continued)

OTHER PUBLICATIONS

International Search Report and Written Opinion issued in corresponding International Application No. PCT/EP2020/066111, mailed Sep. 3, 2020.

*Primary Examiner* — Ibrahime A Abraham
*Assistant Examiner* — Daniel Ward Hatten
(74) *Attorney, Agent, or Firm* — Troutman Pepper Locke LLP

(57) ABSTRACT

A beverage liquid dispenser, in particular coffee or hot water, comprising a hollow body having at least one storage chamber provided with at least one inlet hole for the beverage liquid, at least one dispensing chamber provided below with at least one dispensing hole for dispensing the beverage liquid, said storage chamber having a descending bottom and being provided at the lowest point of said bottom with a first connecting opening connecting to said dispensing chamber, said dispensing chamber having at least a first descending connecting channel connecting said first opening to a first perimeter zone of said dispensing hole, characterized in that said storage chamber is provided with at least a second connecting opening connecting to said dispensing chamber, said dispensing chamber having at least a second descending connection channel connecting said second opening to a second perimeter zone of said dispensing hole that is distinct and separate from said first zone.

14 Claims, 3 Drawing Sheets

(58) Field of Classification Search
USPC .......................................................... 99/279
See application file for complete search history.

(56) References Cited

FOREIGN PATENT DOCUMENTS

| WO | WO-2019013622 A2 * | 1/2019 | .......... A47J 31/0668 |
| WO | 2019112434 A1 | 6/2019 | |
| WO | WO-2019121593 A1 * | 6/2019 | .......... A47J 31/4496 |

* cited by examiner

BEVERAGE LIQUID DISPENSER

CROSS-REFERENCE TO RELATED APPLICATIONS

This is a U.S. national phase application under 35 U.S.C. § 371 of International Patent Application No. PCT/EP2020/066111, filed Jul. 10, 2020, and claims benefit of priority to Italian Patent Application No. 102019000012198, filed Jul. 17, 2019. The entire contents of these applications are hereby incorporated by reference.

TECHNICAL FIELD

The present invention relates to a beverage liquid dispenser, in particular coffee or hot water, associated with a machine for preparing such liquids.

BACKGROUND

Beverage liquid dispensers have long been present on the market, constituting the final stage of the process of preparing and distributing liquid from the packaging machine, with which they are variously associated, to the single container of the beverage thus intended for the user's consumption, or to a plurality of such containers.

Likewise, dispensers have long been known which receive fluid or different fluids from more than one conduit connecting with the machine body and can dispense the beverage from a single outlet or from a plurality of outlets.

By way of example, EP 2721976 B1 and EP 2732741 B1 relate to a dispenser with different supply connections which discharge a beverage or a mixture of beverages into a single dispenser, differently characterized for the coupling and connection to the machine body.

EP 2565151 relates to a dispenser with an intermediate storage chamber between the inlet and outlet to eliminate fluid turbulence, and where the connection with the outlet nozzle has a smaller diameter than the connection of the entering fluid.

It is known that an appreciated feature of beverage liquid dispensers, in particular coffee dispensers, is dispensing with a steady, well-directed flow.

As is known, traditional dispensers are notoriously ineffective because, especially with low flow rates, the liquid tends not to completely fill the inner area of the dispenser, finding preferential outlet routes on one or more walls of the outlet conduit of the dispenser itself: this can lead to an irregular flow, for example in the dispensing of a single espresso coffee, ruining the appearance in the cup, or a random division of the liquid dispensed in the cup in the case of two outlet nozzles from the same dispenser.

Depending on the liquid dispensed and its density, in traditional dispensers the flow rests on one or more walls of the outlet conduit, making the percolation uneven.

There is therefore a need to intervene on the structure of the known beverage liquid dispensers.

SUMMARY

The technical task of the present invention is therefore to realize a beverage liquid dispenser which makes it possible to eliminate the cited technical drawbacks of the prior art.

As part of this technical task, an object of the invention is to create a beverage liquid dispenser that guarantees a constant flow of liquid.

Another object of the invention is to create a beverage liquid dispenser that in the case of more than one outlet nozzle allows to ensure the precise division of the liquid dispensed by the different nozzles.

Not least, an object of the invention is to realize a beverage liquid dispenser that ensures dispensing with a well-directed and vertical flow.

The technical task, as well as these and other objects, according to the present invention are reached by realizing a beverage liquid dispenser, indicatively but not exhaustively coffee, comprising a hollow body having at least one storage chamber for storing the beverage liquid, the storage chamber being provided with at least one inlet hole for the beverage liquid, at least one dispensing chamber for dispensing the beverage liquid provided below with at least one dispensing hole for dispensing the beverage liquid, said storage chamber having a descending bottom and being provided at the lowest point of said bottom with a first connecting opening connecting to said dispensing chamber, said dispensing chamber having at least a first descending connecting channel connecting said first opening to a first perimeter zone of said dispensing hole, characterized in that said storage chamber is provided with at least a second connecting opening connecting to said dispensing chamber, said dispensing chamber having at least a second descending connecting channel connecting said second opening to a second perimeter zone of said dispensing hole that is distinct and separate from said first zone.

Preferably said second connecting opening is provided in a position that is raised with respect to said first connecting opening.

Preferably said first connecting opening and second connecting opening are positioned on a side separating wall between said storage chamber and said dispensing chamber.

Preferably said first connecting opening extends upwards from the lowest point of said bottom of said storage chamber and said second opening extends upwards from the highest point of said bottom of said storage chamber.

Preferably said bottom of said storage chamber has a tilt towards said dispensing chamber.

Preferably said dispensing chamber is provided with flow homogenizing means.

Preferably said flow homogenizing means comprises at least one partial barrier baffle of the flow positioned inside said first descending connecting channel.

Preferably said storage chamber and said dispensing chamber are bounded directly by at least one outer wall of said hollow body, and by said at least one separating wall.

Other characteristics of the present invention are also defined in the following claims.

BRIEF DESCRIPTION OF THE DRAWINGS

Further characteristics and advantages of the invention will become more apparent from the description of a preferred, but not exclusive, embodiment of the beverage liquid dispenser according to the invention, indicatively but not exhaustively coffee, which is illustrated by way of approximate and non-limiting example in the attached drawings, in which.

DETAILED DESCRIPTION

Figure 1B:
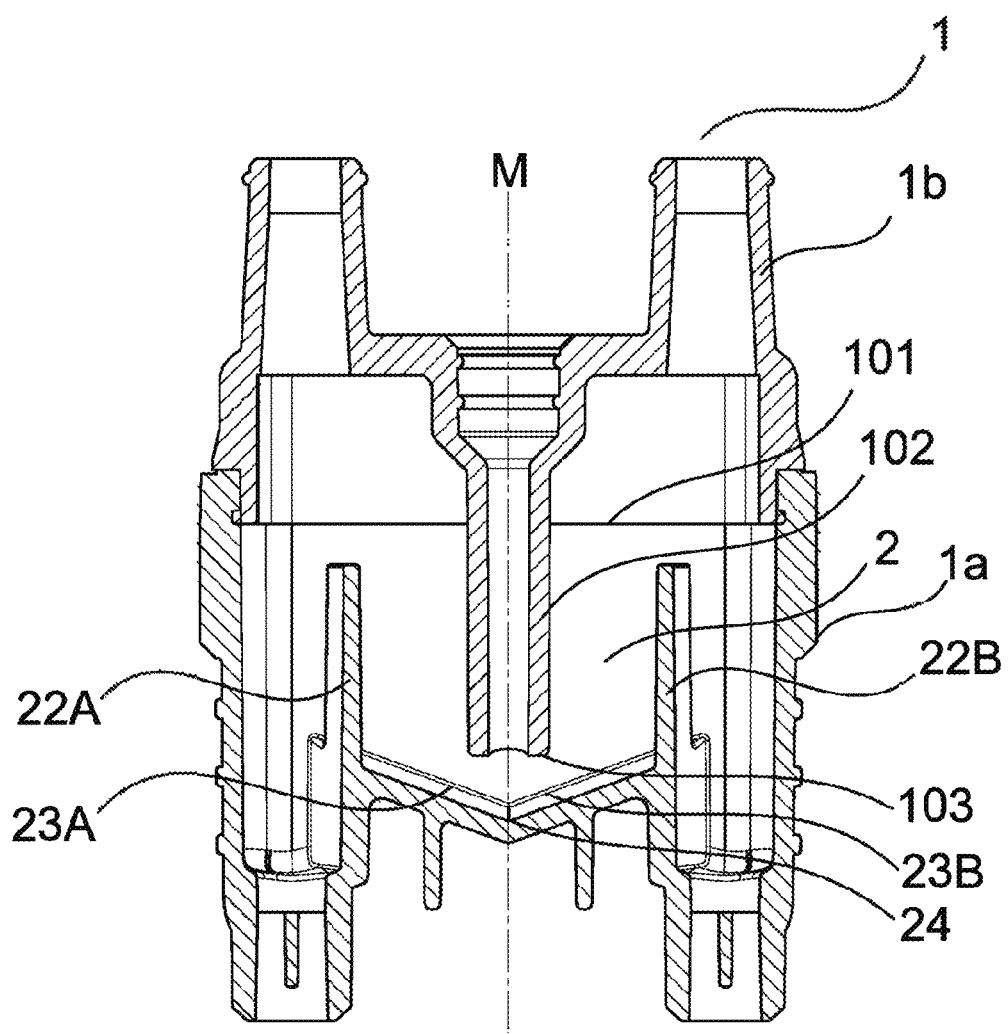
FIG. 1a shows a view from above and FIG. 1b shows a longitudinal section taken along the line B-B of FIG. 1a of the dispenser.
Figure 1A:
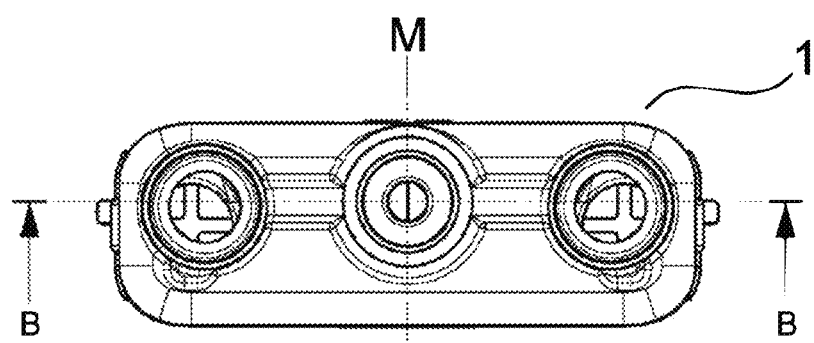
Figure 2B:
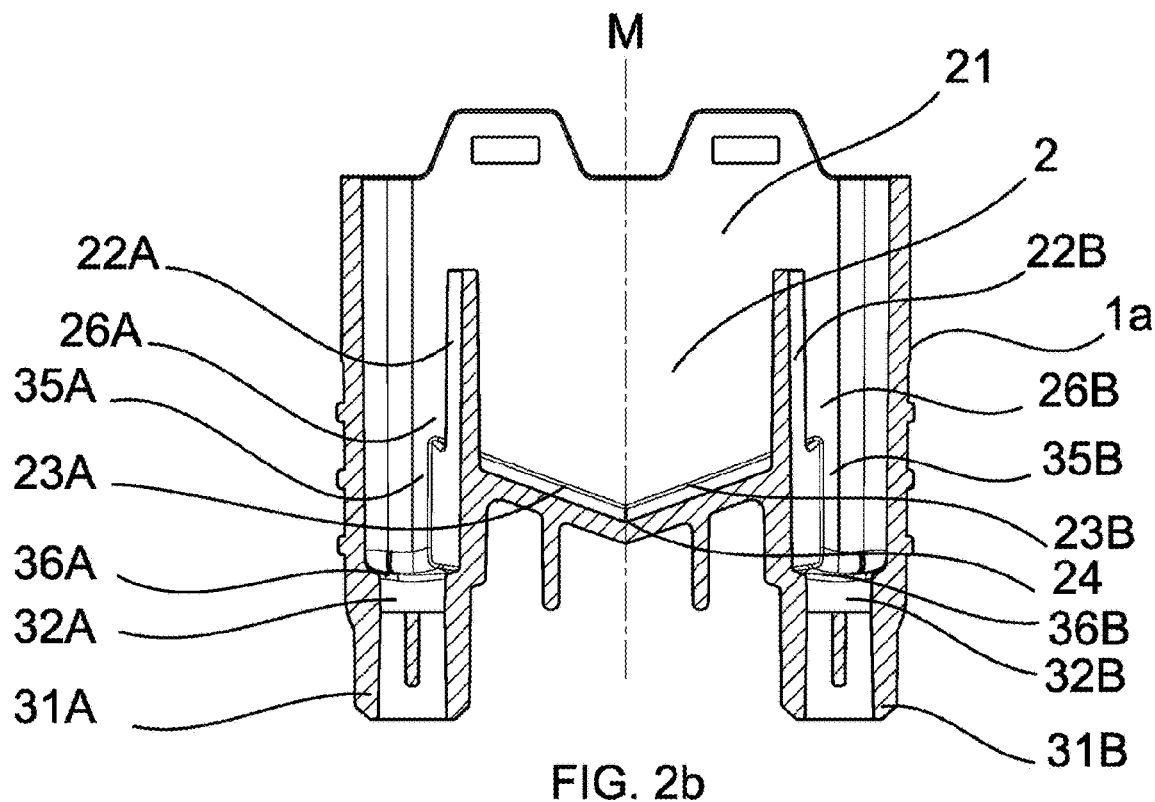
FIG. 2a shows a view from above and FIG. 2b shows a section taken along the longitudinal line D-D of FIG. 2a of the lower part of the dispenser.
Figure 2A:
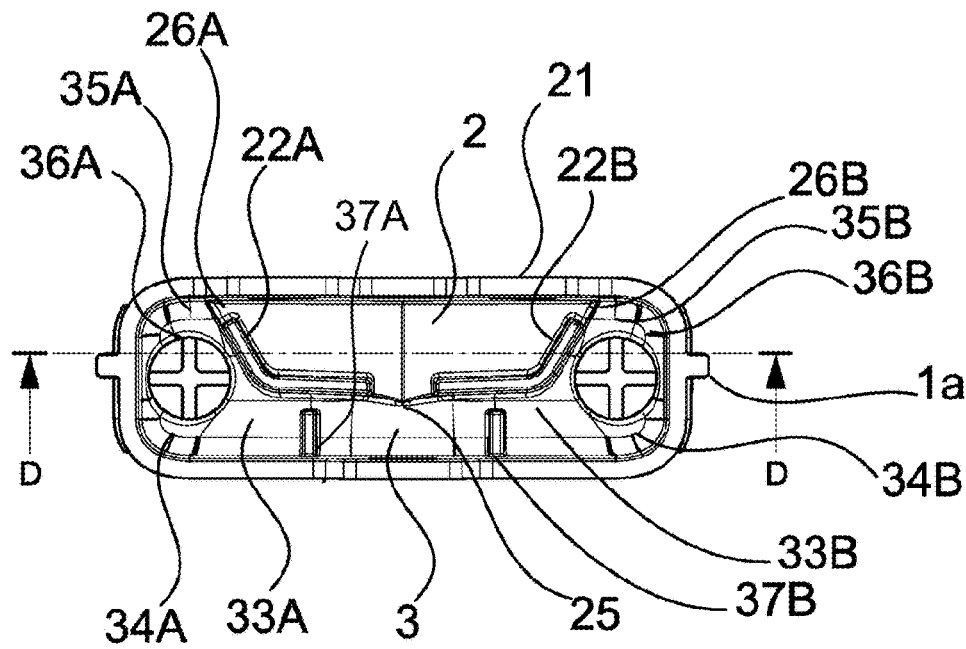
Figure 3B:
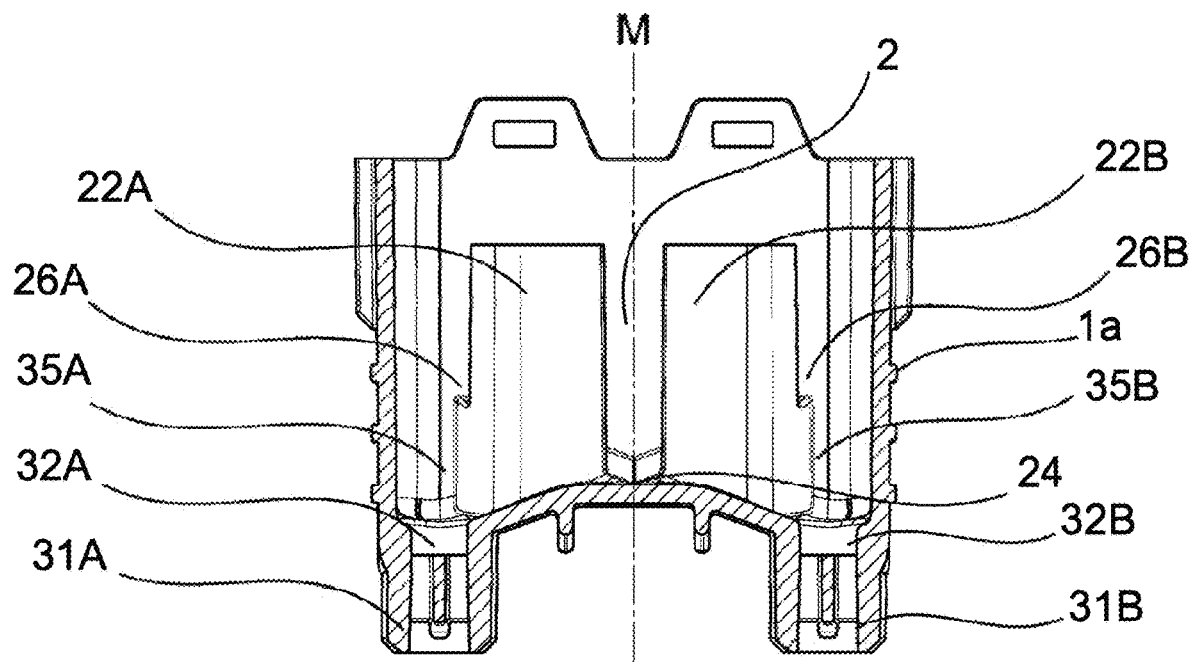
FIG. 3a shows a view from above and FIG. 3b shows a longitudinal section taken along the line E-E of FIG. 3a of the lower part of the dispenser.
Figure 3A:
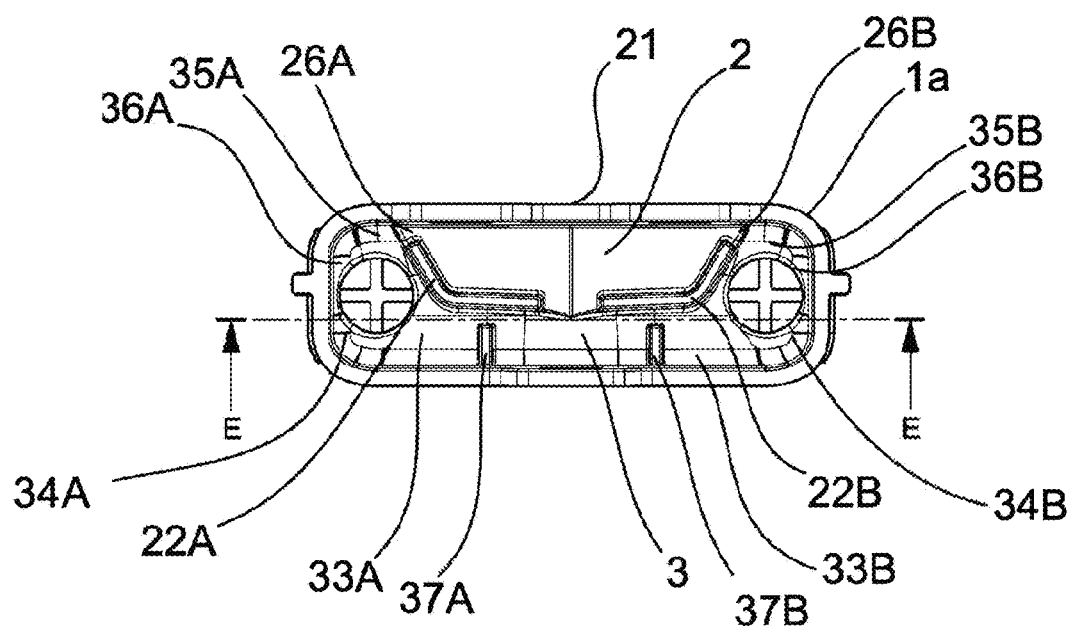

With reference to the above mentioned figures, a beverage liquid dispenser is shown, indicatively but not exhaustively coffee, denoted in its entirety by reference numeral 1.

The dispenser 1 has a hollow body formed, preferably but not necessarily, by a lower piece 1a and an upper piece 1b associated with each other and to be associated, with non-highlighted constraining means, directly to the machine body for the preparation of beverage liquids, or to a housing fixed to the machine body. The upper piece 1b transfers, through an open upper surface 101 conjugated to a lower open surface of the upper piece 1a, by means of a channel 102 and a nozzle 103, the liquid packaged in the machine body to a storage chamber 2 of the dispenser 1 communicating with a dispensing chamber 3 of the dispenser 1.

The storage chamber 2 is perimetrally defined by an outer vertical wall 21 of the dispenser 1 and by one or more inner vertical walls 22A and 22B of the dispenser 1, for example but not necessarily convex.

The dispensing chamber 3 is perimetrally bounded by an outer vertical wall of the dispenser 1 complementary to and opposite the outer vertical wall of the storage chamber 2.

In the preferred solution of the present invention described herein, the storage chamber 2 and the dispensing chamber 3 are configured symmetrically with respect to a transverse vertical middle plane M of the hollow body of the dispenser 1.

Inside the hollow body of the dispenser 1, the storage chamber 2 and the dispensing chamber 3 are separated and bounded directly by the pair of convex vertical walls 22A and 22B.

The storage chamber 2 is defined below by a bottom 23A and 23B inclined descending towards the transverse axis of the storage chamber 2.

The bottom of the storage chamber 2 is formed by one or more bottom surfaces 23A and 23B, for example flat, which join together in a valley 24, coinciding with the axis of symmetry of the dispenser 1.

The bottom of the storage chamber 2, and the valley 24, also have a tilt towards the dispensing chamber 3, opposite the vertical wall 21 of the dispenser 1.

At the valley 24, the storage chamber 2 has a first connecting opening 25 connecting to the dispensing chamber 3, which also represents the lowest point of the storage chamber 2.

The dispensing chamber 3 is equipped below with a nozzle 31A from the dispensing hole 32A from which the liquid for beverages is transferred to the outer container for consumption, not shown.

In the dispensing chamber 3 there is a first descending connecting channel 33A between the first opening 25 of the storage chamber 2 and a first perimeter zone 34A of the dispensing hole 32A.

The storage chamber 2 is then provided with at least a second connecting opening 26A connecting to the dispensing chamber 3.

In the dispensing chamber 3 there is a second descending connecting channel 35A between the second opening 26A of the storage chamber 2 and a second perimeter zone 36A of the dispensing hole 32A, distinct and separate from the first perimeter zone 34A of the dispensing hole 32A.

The second connecting opening 26A connecting the storage chamber 2 with the dispensing chamber 3 is provided in a position that is raised with respect to the first connecting opening 25.

Both the first connecting opening 25 and the second connecting opening 26A connecting the storage chamber 2 with the dispensing chamber 3 are positioned in the convex vertical wall 22A defining the perimeter of the storage chamber 2 and are formed by a first and respectively a second vertical slit that extend upwards at full height on the convex wall 22A.

The first connecting opening 25 extends upwards from the lowest point of the valley 24 of the downwards tilted bottom surface 23A of the storage chamber 2; the second connecting opening 26A extends upwards from the highest point of the downwards tilted bottom surface 23A of the storage chamber 2.

The dispensing chamber 3 is further provided with beverage liquid flow homogenizing means, advantageously comprising partial barrier baffles 37A inside the first descending connecting channel 33A.

The symmetry of the configuration of the invention described herein in a preferred solution and found in the drawings referred to above, allows the validity of the description to be confirmed also for the second half of the dispenser 1 with numerical references of type B.

The dispensing chamber 3 is therefore equipped below with a nozzle 31B from the dispensing hole 32B from which the liquid for beverages is transferred to the outer container for consumption, not shown.

In the dispensing chamber 3 there is a third descending connecting channel 33B between the first opening 25 of the storage chamber 2 and a first perimeter zone 34B of the dispensing hole 32B.

The storage chamber 2 is then provided with at least a third connecting opening 26B connecting to the dispensing chamber 3.

In the dispensing chamber 3 there is a fourth descending connecting channel 35B between the third opening 26B of the storage chamber 2 and a second perimeter zone 36B of the dispensing hole 32B, distinct and separate from the first perimeter zone 34B of the dispensing hole 32B.

The third connecting opening 26B connecting the storage chamber 2 with the dispensing chamber 3 is provided in a position that is raised with respect to the first connecting opening 25. Both the first connecting opening 25 and the third connecting opening 26B connecting the storage chamber 2 with the dispensing chamber 3 are positioned in the convex vertical wall 22B defining the perimeter of the storage chamber 2 and are formed by a first and respectively a second vertical slit that extend upwards at full height on the convex wall 22B.

The first connecting opening 25 extends upwards from the lowest point of the valley 24 of the downwards tilted bottom surface 23B of the storage chamber 2; the third connecting opening 26B extends upwards from the highest point of the downwards tilted bottom surface 23B of the storage chamber 2.

The dispensing chamber 3 is further provided with beverage liquid flow homogenizing means, advantageously comprising partial barrier baffles 37B inside the third descending connecting channel 33B.

The operation of the dispenser 1 according to the invention emerges clearly from the description and illustration above and, in particular, is substantially as follows. The nozzle 103 transfers the packaged liquid to the storage chamber 2 of the dispenser 1; through the first opening 25 and the first descending connecting channel 33A the liquid is transferred to the first perimeter zone 34A of the dispensing hole 32A; through the second opening 26A and the second descending connecting channel 35A the liquid is transferred to the second perimeter zone 36A of the dispensing hole 32A, distinct and separate from the first perimeter zone 34A.

And symmetrically: through the first opening 25 and the third descending connecting channel 33B the liquid is transferred to the first perimeter zone 34B of the dispensing hole 32B; through the third opening 26B and the fourth descending connecting channel 35B the liquid is transferred to the second perimeter zone 36B of the dispensing hole 32B, distinct and separate from the first perimeter zone 34B. The preventive storage in the storage chamber 2 and the symmetrical supply of the liquid to two distinct and separate perimeter zones 34A and 36A of the dispensing hole 32A and to two distinct and separate perimeter zones 34B and 36B of the dispensing hole 32B, guarantee the elimination of flow turbulence of the fluid, the symmetry of the supply and the containment of the deviation of the volumes of the fluid to the dispensing holes 32A and 32B, and the homogenization of the liquid and its ordered, homogeneous and constant percolation through the nozzle 31A and the nozzle 31B.

Modifications and variations to that which is described are of course possible.

In practice, it has been found that a beverage liquid dispenser, in particular for coffee, according to the invention is particularly advantageous for the ordered, homogeneous and constant dispensing of liquid to a nozzle, and for a precise and uniform subdivision and dispensing of the liquid to multiple nozzles.

A beverage liquid dispenser as conceived herein is susceptible to numerous modifications and variants, all falling within the scope of the inventive concept; furthermore, all the details are replaceable by technically equivalent elements.

In practice, the materials used, as well as the dimensions, can be any according to the needs and the state of the art.

The invention claimed is:

1. A beverage liquid dispenser comprising:
   a hollow body comprising at least one storage chamber storing the beverage liquid, the storage chamber comprising:
   at least one inlet hole for the beverage liquid,
   at least one dispensing chamber positioned below the storage chamber, the dispensing chamber comprising at least one dispensing hole for dispensing the beverage liquid, a descending tilted bottom provided at the lowest point of said bottom with a first connecting opening connecting to said dispensing chamber, said dispensing chamber comprising at least a first descending connecting channel connecting said first opening to a first perimeter zone of said dispensing hole, said storage chamber being provided with at least a second connecting opening connecting to said dispensing chamber, said dispensing chamber comprising at least a second descending connecting channel connecting said second opening to a second perimeter zone of said dispensing hole that is distinct and separate from said first zone,
   wherein said dispensing chamber comprises a first dispensing hole and respectively a second dispensing hole for dispensing the beverage liquid, and has a first and respectively a third descending connecting channel connecting said first opening to a first perimeter zone of said first dispensing hole and respectively to a first perimeter zone of said second dispensing hole, said storage chamber being provided with a second and respectively with a third connecting opening connecting to said dispensing chamber, said dispensing chamber having a second and respectively a fourth descending connecting channel of said second and respectively third opening connecting to a second perimeter zone of said first hole and respectively second perimeter zone of said second dispensing hole, that are distinct and separate from said first perimeter zone and respectively first perimeter zone.

2. The beverage liquid dispenser according to claim 1, wherein said second connecting opening is provided in a position that is raised with respect to said first connecting opening.

3. The beverage liquid dispenser according to claim 2, wherein said first connecting opening and second connecting opening are positioned on a side separating wall between said storage chamber and said dispensing chamber.

4. The beverage liquid dispenser according to claim 3, wherein said side separating wall is vertical.

5. The beverage liquid dispenser according to claim 3, wherein said first connecting opening and second connecting opening are formed by a first and respectively a second slit that extend upwards along said side separating wall.

6. The beverage liquid dispenser according to claim 5, wherein said first connecting opening extends upwards from the lowest point of said bottom of said storage chamber and said second opening extends upwards from the highest point of said bottom of said storage chamber.

7. The beverage liquid dispenser according to claim 1, wherein said bottom of said storage chamber has a tilt towards said dispensing chamber.

8. The beverage liquid dispenser according to claim 1, wherein said dispensing chamber is provided with flow homogenizing device.

9. The beverage liquid dispenser according to claim 8, wherein said flow homogenizing device comprises at least one partial barrier baffle of the flow positioned inside said first descending connecting channel.

10. The beverage liquid dispenser according to claim 1, wherein said storage chamber and said dispensing chamber are bounded directly by at least one outer wall of said hollow body, and by said at least one separating wall.

11. The beverage liquid dispenser according to claim 1, wherein said storage chamber and said dispensing chamber are configured symmetrically with respect to a transverse vertical middle plane of said hollow body.

12. The beverage liquid dispenser according to claim 11, wherein said first connecting opening is positioned at said transverse vertical middle plane, said second and third connecting opening have the same shape and size and symmetrical position as said transverse vertical middle plane.

13. The beverage liquid dispenser according to claim 11, wherein said bottom has a tilt towards said dispensing chamber and a tilt towards a valley coinciding with said middle plane.

14. A coffee machine comprising a machine body, a housing fixed to the machine body and a coffee dispenser according to claim 1 in said housing.

* * * * *